United States Patent
Fendler et al.

(10) Patent No.: US 11,932,276 B2
(45) Date of Patent: Mar. 19, 2024

(54) SELECTION OF A TARGET OBJECT FOR AT LEAST AUTOMATED GUIDANCE OF A MOTOR VEHICLE

(71) Applicant: Bayerische Motoren Werke Aktiengesellschaft, Munich (DE)

(72) Inventors: Tamas Fendler, Krailing (DE); Robert Knorrn, Oberhaching (DE); Thomas Velten, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 389 days.

(21) Appl. No.: 17/267,258

(22) PCT Filed: Jul. 24, 2019

(86) PCT No.: PCT/DE2019/100681
§ 371 (c)(1),
(2) Date: Feb. 9, 2021

(87) PCT Pub. No.: WO2020/030217
PCT Pub. Date: Feb. 13, 2020

(65) Prior Publication Data
US 2021/0309256 A1    Oct. 7, 2021

(30) Foreign Application Priority Data
Aug. 10, 2018  (DE) ............... 10 2018 213 470.7

(51) Int. Cl.
*B60W 60/00* (2020.01)
*B60W 30/095* (2012.01)
*B60W 40/107* (2012.01)

(52) U.S. Cl.
CPC .... *B60W 60/0015* (2020.02); *B60W 30/0956* (2013.01); *B60W 40/107* (2013.01);
(Continued)

(58) Field of Classification Search
None
See application file for complete search history.

(56) References Cited

U.S. PATENT DOCUMENTS

2020/0031352 A1* 1/2020 Takaki ............... B60W 60/0018
2020/0391733 A1* 12/2020 Kumagai ............ B60T 8/17558

FOREIGN PATENT DOCUMENTS

CN          103370238 A    10/2013
DE   10 2009 006 747 A1    8/2010
(Continued)

OTHER PUBLICATIONS

Machine translation of DE102014212704 (Year: 2023).*
(Continued)

*Primary Examiner* — Aniss Chad
*Assistant Examiner* — Jennifer M Anda
(74) *Attorney, Agent, or Firm* — Crowell & Moring LLP

(57) ABSTRACT

A driving system for at least automated longitudinal guidance for a motor vehicle is designed to determine or receive a virtual acceleration for the motor vehicle, to determine, for each of at least two further road users in the environment of the motor vehicle, the duration until a virtual collision of the motor vehicle with the road user in question, in each case at least in dependence on the virtual acceleration of the motor vehicle, to select one of the at least two further road users as a target object in dependence on the respective durations until a virtual collision of the motor vehicle with the respective road users, which durations were determined for the at least two further road users, and to determine the longitudinal guidance for the motor vehicle in dependence on the road user selected as the control object.

16 Claims, 2 Drawing Sheets

(52) U.S. Cl.
CPC .............. *B60W 2554/4042* (2020.02); *B60W 2554/804* (2020.02)

(56) References Cited

FOREIGN PATENT DOCUMENTS

| | | |
|---|---|---|
| DE | 10 2014 212 704 A1 | 1/2016 |
| JP | 2001-84495 A | 3/2001 |
| JP | 2011-219056 A | 11/2011 |
| KR | 10-2014-0118153 A | 10/2014 |
| KR | 10-1478068 B1 | 1/2015 |

OTHER PUBLICATIONS

"Rechtsfolgen zunehmender Fahrzeugautomatisierung", Bundesanstalt fuer Strassenwesen (BASt) [German Federal Highway Research Agency], Forschung kompakt [Research compact], Edition Nov. 2012 with English Abstract (two (2) pages).

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).

German-language Office Action issued in German Application No. 10 2018 213 470.7 dated Feb. 9, 2023 (seven (7) pages).

Korean-language Office Action issued in Korean Application No. 10-2021-7001324 dated Feb. 15, 2022 (11 pages).

International Search Report (PCT/ISA/210) issued in PCT Application No. PCT/DE2019/100681 dated Dec. 18, 2019 with English translation (six (6) pages).

German-language Written Opinion (PCT/ISA/237) issued in PCT Application No. PCT/DE2019/100681 dated Dec. 18, 2019 (seven (7) pages).

German-language Search Report issued in German Application No. 10 2018 213 470.7 dated Feb. 12, 2019 with partial English translation (11 pages).

Chinese-language Office Action issued in Chinese Application No. 2019-80046999.4 dated Jan. 21, 2024, with English translation (11 pages).

* cited by examiner

SELECTION OF A TARGET OBJECT FOR AT LEAST AUTOMATED GUIDANCE OF A MOTOR VEHICLE

BACKGROUND AND SUMMARY OF THE INVENTION

The invention relates to a driving system and to a method for selecting a target object for at least automated longitudinal guidance of a motor vehicle.

The term "automated driving" can be understood within the scope of the document to mean driving with automated longitudinal or lateral guidance or autonomous driving with automated longitudinal and lateral guidance. The term "automated driving" comprises automated driving with any desired degree of automation. Exemplary degrees of automation are assisted, partially automated, highly automated or fully automated driving. These degrees of automation have been defined by the Bundesanstalt für Stralenwesen (BASt) [German Federal Highway Research Agency], (see BASt publication "Forschung kompakt [Research compact]", issue 11/2012). During assisted driving, the driver continuously executes the longitudinal or lateral guidance while the system performs the respective other function within certain limits. In the case of partially automated driving (TAF) the system performs the longitudinal and lateral guidance for a certain time period and/or in specific situations, wherein the driver has to continuously monitor the system as in the case of assisted driving. In the case of highly automated driving (HAF), the system performs the longitudinal and transverse guidance for a certain time period, without the driver having to continuously monitor the system; but the driver must be able to take over the guidance of the vehicle within a certain time period. In the case of fully automated driving (VAF), the system can automatically control the driving in all situations for a specific application; in this application there is no longer a need for a driver. The four degrees of automation specified above according to the definition of the BASt correspond to the SAE levels 1 to 4 of the Standard SAE J3016 (SAE—Society of Automotive Engineering). For example, highly automated driving (HAF) according to the BASt corresponds to level 3 of the Standard SAE J3016. In addition, in SAE J3016, the SAE level 5 is also provided as the highest degree of automation which is not included in the definition of the BASt. The SAE level 5 corresponds to driverless driving in which the system can automatically control all the situations like a human driver during the entire journey. A driver is generally no longer required.

It is known to select a target object for at least automated longitudinal guidance of a motor vehicle by determining a time period up to a collision with the target object. A problem with this procedure is that in many cases a time period up to a collision with the target object cannot be determined, for example if the speed of the target object is higher than the speed of the motor vehicle. For such cases, computationally intensive exception handling has to be provided in known approaches.

The object of the invention is to specify a driving system and a method for selecting a target object for at least automated longitudinal guidance of a motor vehicle, which does not rely on computationally intensive exception handling.

The object is achieved by means of the features of the independent patent claims. Advantageous embodiments are described in the dependent claims. It is to be noted that additional features of a patent claim which is dependent on an independent patent claim can form a separate invention which is dependent on the combination of all the features of the independent patent claim and can be made a subject matter of an independent claim, of a partial application or of a subsequent application, without the features of the independent patent claim or only in combination with a subset of the features of the independent patent claim. This applies in the same way to technical teachings which are described in the description and which can form an invention which is independent of the features of the independent patent claims.

A first aspect of the invention relates to a driving system for at least automated longitudinal guidance for a motor vehicle.

The driving system is configured to determine or receive a virtual acceleration for the motor vehicle. The virtual acceleration is a virtual acceleration in particular because the virtual acceleration is not used for the actual longitudinal guidance of the motor vehicle. The virtual acceleration is, in particular, a constant value, for example 0.5 m/s$^2$, 1 m/s$^2$, or 1.5 m/s$^2$.

Moreover, the driving system is configured to determine, for at least two further road users in the surroundings of the motor vehicle, in each case one time period up to a virtual collision of the motor vehicle with the respective road user, in each case at least as a function of the virtual acceleration of the motor vehicle.

In this context, the invention is based on the recognition that when the virtual acceleration is taken into account and there is the additional simplifying assumption that all the road users are moving exclusively in the longitudinal direction on a lane, the motor vehicle will collide in a finite time with any further road user, independent of the actual speed of the respective road user.

The term "virtual collision" is intended to clarify here, in particular, that there may not be an actual collision of the motor vehicle with one of the further road users since the motor vehicle is actually not accelerating with the virtual acceleration.

In particular, the driving system is configured to determine, for in each case two further road users in the surroundings of the motor vehicle, in each case one time period up to a virtual collision of the motor vehicle with the respective road user, in each case at least as a function of the virtual acceleration of the motor vehicle, a spatial distance between the respective road user and the motor vehicle, a speed of the respective road user and/or a speed of the motor vehicle.

Moreover, the driving system is configured to select one of the at least two further road users as a target object as a function of the time periods which are respectively determined for the at least two further road users, up to a virtual collision of the motor vehicle with the respective road user, and to determine the longitudinal guidance for the motor vehicle as a function of the road user which is selected as a target object.

In particular, the longitudinal guidance for the motor vehicle can be determined as a function of the speed of the road user which is selected as a target object.

As an alternative to this, the longitudinal guidance for the motor vehicle can, in particular, also be determined as a function of the spatial distance of the motor vehicle from the road user which is selected as a target object.

In one advantageous embodiment, the driving system is configured to select, from the at least two further road users, that road user for which the shortest time period up to the virtual collision between the motor vehicle and the respective road user has been determined.

In this context, the invention is based on the recognition that the time period up to the virtual collision between the motor vehicle and the respective road user is a measure which is suitable for prioritizing the further road users and may be advantageous to determine the longitudinal guidance of the motor vehicle as a function of the further road user which is categorized most critically.

In a further advantageous embodiment, the driving system is configured to determine or receive, for one of the at least two further road users, a correction value for the time period determined for the at least one road user, up to the virtual collision with the motor vehicle, and to correct, before the selection of a road user from the at least two further road users, the time period determined for the at least one road user up to the virtual collision with the motor vehicle, as a function of the correction value.

In particular, the correction value can be a sum of a plurality of further correction values here.

In this context, the invention is based on the recognition that, in particular, safety distances in road traffic are frequently defined as what is referred to as a "second interval". In this context, the distance which is traveled in a defined number of seconds is defined as a safety interval, for example the distance which is traveled in one second or the distance which is traveled in two seconds.

In order, for example, to be able to allow for such a safety distance, the time period which is determined for the at least one road user up to the virtual collision with the motor vehicle can be corrected with a corresponding correction value.

In particular, if the correction value exceeds, in absolute value, the time period determined for the at least one road user up to the virtual collision with the motor vehicle, the correction value can be disregarded.

In this context, the invention is based on the recognition that the correction value has to be disregarded, since the virtual collision time is in the past. As soon as the safety distance from at least one object has been undershot, all the objects must be compared with a virtual collision (without correction). A mixture (collision time with correction and collision time without correction) is not admissible.

In one advantageous embodiment, the driving system is configured to correct the time period determined for the at least one road user, up to the virtual collision with the motor vehicle, as a function of the correction value, in such a way that the time period determined for the at least one road user, up to the virtual collision with the motor vehicle, is reduced by the correction value.

In a further advantageous embodiment, the driving system is configured to determine or receive a correction value, and to correct the time periods determined for all further road users, up to the virtual collisions with the motor vehicle as a function of the same correction value, wherein the correction value is characteristic, for example, of a safety interval which is to be maintained.

In a further advantageous embodiment, the driving system is configured to determine or receive in each case one correction value for each of the at least two further road users, and to correct the time periods obtained for the further road users, up to the virtual collisions with the motor vehicle, in each case by the correction value which has been determined or received for the respective road user.

In a further advantageous embodiment, the driving system is configured to determine a lane on which the motor vehicle is located, to determine, for at least one of the further road users, a lane on which the at least one further road user is located, to compare, for the at least one further road user, the lane on which the motor vehicle is located, with the lane on which the at least one further road user is located, and to determine the correction value for the at least one further road user as a function of the comparison.

Here, the invention is based on the realization that the criticality of a road user cannot be determined exclusively by the time periods up to the virtual collision with the motor vehicle but rather in reality the lanes on which the road user and the motor vehicle are located also play a decisive role.

In one advantageous embodiment, the driving system is configured to determine, for a first further road user which is located on the same lane as the motor vehicle a correction value which is lower in absolute value than for a second further road user which is not located on the same lane as the motor vehicle.

Here, the invention is based on the realization that the actual risk of a collision of the motor vehicle with the second further road user is usually lower than the actual risk of a collision of the motor vehicle with the first further road user, since the second further road user is, in contrast to the first further road user, not on the same lane as the motor vehicle.

Therefore, the motor vehicle can usually also travel up closer to the rear of the second further road user than to the rear of the first further road user, which is reflected in a lower correction value for the second further road user.

A second aspect of the invention describes a method for at least automated longitudinal guidance for a motor vehicle.

One step of the method is determining or receiving a virtual acceleration for the motor vehicle.

A further step of the method is determining in each case a time period up to a virtual collision of the motor vehicle with the respective road user, in each case at least as a function of the virtual acceleration of the motor vehicle, for at least two further road users in the surroundings of the motor vehicle.

A further step of the method is selecting, from one of the at least two further road users as a target object, as a function of the time periods which are respectively determined for the at least two further road users, up to a virtual collision of the motor vehicle with the respective road user.

A further step of the method is determining the longitudinal guidance for the motor vehicle as a function of the road user selected as a target object.

The above statement relating to the inventive driving system according to the first aspect of the invention correspondingly also applies to the inventive method according to the second aspect of the invention. Advantageous exemplary embodiments of the method according to the invention which are not explicitly described at this point and in the patent claims correspond to the advantageous exemplary embodiments of the driving system according to the invention which are described above or are described in the patent claims.

The invention will be described below on the basis of an exemplary embodiment with reference to the appended drawings.

DETAILED DESCRIPTION OF THE DRAWINGS

Figure 1:
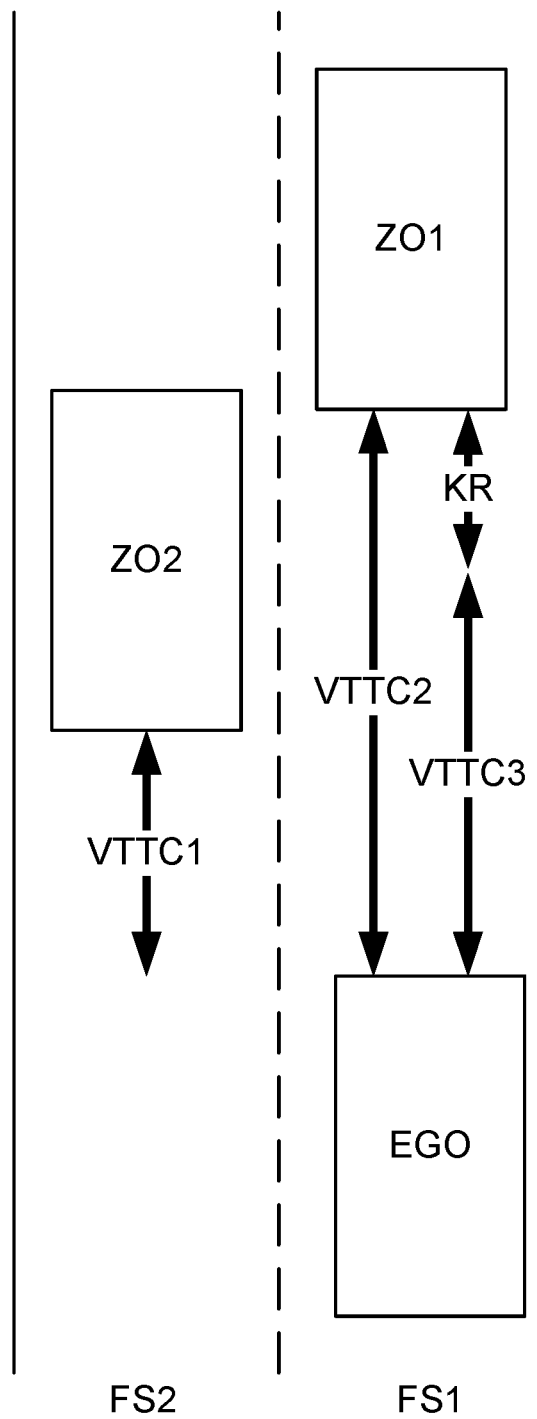
FIG. 1 shows an exemplary traffic situation as an exemplary embodiment of the driving system according to the invention.

FIG. 1 shows an exemplary traffic situation as an exemplary embodiment of the driving system according to the invention for at least automated longitudinal guidance for a motor vehicle EGO.

In this context, the driving system is configured to determine or receive a virtual acceleration for the motor vehicle EGO, and to determine, for at least two further road users ZO1, ZO2 in the surroundings of the motor vehicle EGO, in each case a time period VTTC1, VTTC2, VTTC3 up to a virtual collision of the motor vehicle EGO with the respective road user ZO1, ZO2, in each case at least as a function of the virtual acceleration of the motor vehicle EGO.

For the sake of simplification, in particular only one longitudinal movement and one longitudinal position of all the road users ZO1, ZO2 and of the motor vehicle KFZ will be taken into account here so that a time period up to a virtual collision of the motor vehicle EGO with the respective further road user ZO2 is also determined for the further road users ZO2.

Moreover, the driving system is configured to select one of the at least two further road users ZO1, ZO2 as a target object as a function of the time periods VTTC1, VTTC2, VTTC3, which are respectively determined for the at least two further road users ZO1, ZO2, up to a virtual collision of the motor vehicle EGO with the respective road user ZO1, ZO2.

For example, the driving system is configured here to select, from the at least two further road users ZO1, ZO2, that road user for which the shortest time period VTTC1, VTTC2, VTTC3 up to the virtual collision between the motor vehicle EGO and the respective road user ZO1, ZO2 has been determined.

Furthermore, the driving system is configured to determine the longitudinal guidance for the motor vehicle EGO as a function of the road user selected as the target object, for example as a function of the speed of the road user selected as a target object.

Moreover, the driving system is configured, in particular, to determine or receive, for at least one ZO1 of the at least two further road users ZO1, ZO2, a correction value KR for the time period VTTC2 determined for the at least one road user ZO1, up to the virtual collision with the motor vehicle EGO, and to correct, from the selection of a road user from the at least two further road users ZO1, ZO2, the time period VTTC2 determined for the at least one road user ZO1, up to the virtual collision of the motor vehicle EGO, as a function of the correction value KR, so that a corrected time period VTTC3 up to the virtual collision with the motor vehicle EGO results.

For example, the driving system is configured to correct the time period VTTC2 determined for the at least one road user ZO1, up to the virtual collision with the motor vehicle EGO, as a function of the correction value KR, in such a way that the time period VTTC2 determined for the at least one road user ZO1, up to the virtual collision with the motor vehicle EGO, is reduced by the correction value KR.

In particular, the driving system is configured to determine or receive in each case one correction value KR for each of the at least two further road users ZO1, ZO2, and to correct the time periods VTTC1, VTTC2, VTTC3 obtained for the further road users ZO1, ZO2, up to the virtual collisions with the motor vehicle EGO, in each case by the correction value KR which has been determined or received for the respective road user ZO1, ZO2.

In this context, the driving system is, for example, configured to determine a lane FS1 on which the motor vehicle EGO is located, to determine, for at least one of the further road users ZO1, ZO2, a lane FS1, FS2 on which the at least one further road user ZO1, ZO2 is located, to compare, for the at least one further road user ZO1, ZO2, the lane FS1 on which the motor vehicle EGO is located, with the lane FS1, FS2 on which the at least one further road user ZO1, ZO2 is located, and to determine the correction value KR for the at least one further road user ZO1, ZO2 as a function of the comparison.

For example, the driving system is configured here to determine, for a first further road user ZO1 which is located on the same lane FS1 as the motor vehicle EGO a correction value KR which is lower in absolute value than for a second further road user ZO2 which is not located on the same lane FS1 as the motor vehicle EGO.

Figure 2:
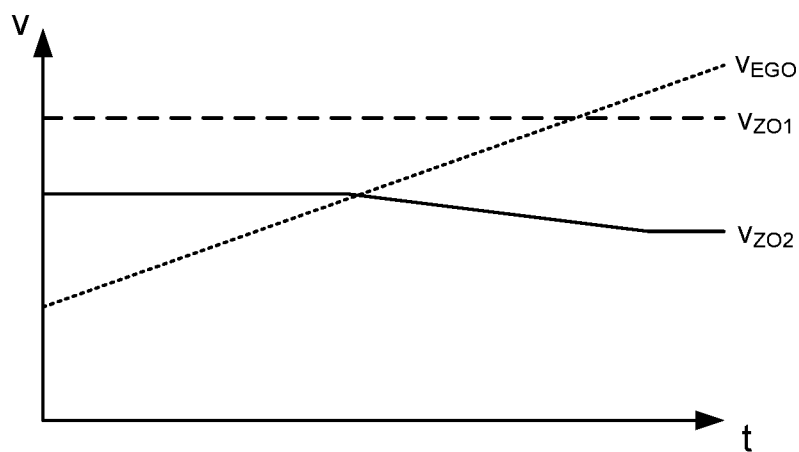
FIG. 2 shows exemplary speed profiles for the embodiment of the driving system according to the invention.

FIG. 2 shows exemplary speed profiles for the execution of the driving system according to the invention. Here, the speeds $v_{EGO}$, $v_{ZO1}$, $v_{ZO2}$ of the motor vehicle EGO and of the further road users ZO1, ZO2 are plotted against the time t.

Owing to the inventive use of the virtual acceleration for the motor vehicle EGO, the speed $v_{EGO}$ of the motor vehicle EGO rises continuously. The speeds $v_{ZO1}$, $v_{ZO2}$ of the further road users ZO1, ZO2 can be, for example, constant or can change in the course of time, but they are limited by the performance of the drive of the road users ZO1, ZO2 and the driving physics. An intersection point of the position of the motor vehicle EGO with the positions of the further road users ZO1, ZO2 results, in particular, from the aspect that object accelerations (according to whatever assumption) can be predicted only over a chronologically finite horizon. A prediction which goes beyond this has no static foundation since the probable driving behavior of the vehicle is then too far removed from reality. Therefore, the speed $v_{EGO}$ of the motor vehicle EGO undoubtedly exceeds the speeds $v_{ZO1}$, $v_{ZO2}$ of the further road users ZO1, ZO2 sooner or later, for which reason a time period VTTC1, VTTC2, VTTC3 up to a virtual collision with the motor vehicle EGO can be determined for each of the further road users ZO1, ZO2.

What is claimed is:

1. A system for configuring automated longitudinal guidance for a motor vehicle, comprising:
a computer-based driving system operatively configured to:
determine or receive a virtual acceleration for the motor vehicle,
determine for each of two further road users in surroundings of the motor vehicle, time periods until a virtual collision of the motor vehicle with the respective road user, in each case as a function of the virtual acceleration of the motor vehicle,
select one of the two further road users as a target object as a function of the determined time periods until the virtual collision of the motor vehicle with the respective road users,
determine or receive a correction value, in terms of time, for the time period determined for the one road user until the virtual collision with the motor vehicle,
correct, using the correction value, the time period determined for the one road user until the virtual collision with the motor vehicle, and
configure the longitudinal guidance to control the motor vehicle as a function of the road user which is selected as the target object.

2. The system according to claim 1, wherein
the road user selected as the target object has that road user for which a shortest time period of the two further road users, until the virtual collision between the motor vehicle and the selected road user has been determined.

3. The system according to claim 2, wherein the driving system is further configured to:
correct the time periods determined for all further road users until the virtual collisions with the motor vehicle as a function of the same correction value.

4. The system according to claim 1, wherein the driving system is further configured to:
correct the time period determined for the one road user until the virtual collision with the motor vehicle as a function of the correction value such that the time period determined for the one road user until the virtual collision with the motor vehicle is reduced by the correction value.

5. The system according to claim 1, wherein
the correction value reduces the time period determined for the one road user until the virtual collision with the motor vehicle.

6. The system according to claim 1, wherein the driving system is further configured to:
determine or receive one correction value for each of the two further road users, and
correct the time periods obtained for the further road users until the virtual collisions with the motor vehicle by the correction value which has been determined or received for the respective road user.

7. The system according to claim 6, wherein the driving system is further configured to:
determine a lane on which the motor vehicle is located,
determine a lane on which the one further road user is located,
compare the lane on which the motor vehicle is located, with the lane on which the one further road user is located, and
determine a new correction value for the one further road user as a function of the comparison.

8. The system according to claim 7, wherein the driving system is further configured to:
determine, for a first further road user located on the same lane as the motor vehicle, a first correction value lower in absolute value than a second correction value for a second further road user not located on the same lane as the motor vehicle.

9. A method for configuring automated longitudinal guidance for a motor vehicle, comprising:
determining or receiving a virtual acceleration for the motor vehicle;
determining, for each of two further road users in surroundings of the motor vehicle, a time period until a virtual collision of the motor vehicle with the respective road user as a function of the virtual acceleration of the motor vehicle;
selecting one of the two further road users as a target object as a function of the time periods until the virtual collision of the motor vehicle with the respective road user;
determining or receiving a correction value, in terms of time, for the time period determined for the one further road user until the virtual collision with the motor vehicle;
correcting, using the correction value, the time period determined for the one further road user until the virtual collision with the motor vehicle; and
configuring the longitudinal guidance to control the motor vehicle as a function of the road user which is selected as the target object.

10. The method according to claim 9, wherein
the road user selected as the target object has a shortest time period, of the two further road users, until the virtual collision between the motor vehicle and the selected road user has been determined.

11. The method according to claim 10, further comprising:
correcting the time periods determined for all further road users until the virtual collisions with the motor vehicle as a function of the same correction value.

12. The method according to claim 9, further comprising:
correcting the time period determined for the one road user until the virtual collision with the motor vehicle as a function of the correction value such that the time period determined for the one road user until the virtual collision with the motor vehicle is reduced by the correction value.

13. The method according to claim 9, wherein
the correction value reduces the time period determined for the one road user until the virtual collision with the motor vehicle.

14. The method according to claim 9, further comprising:
determining or receiving one correction value for each of the two further road users, and
correcting the time periods obtained for the further road users until the virtual collisions with the motor vehicle by the correction value which has been determined or received for the respective road user.

15. The method according to claim 14, further comprising:
determining a lane on which the motor vehicle is located,
determining a lane on which the one further road user is located,
comparing the lane on which the motor vehicle is located, with the lane on which the one further road user is located, and
determining a new correction value for the one further road user as a function of the comparison.

16. The method according to claim 15, further comprising:
determining, for a first further road user located on the same lane as the motor vehicle, a first correction value lower in absolute value than a second correction value for a second further road user not located on the same lane as the motor vehicle.

* * * * *